US012716450B2

(12) United States Patent
Schertz

(10) Patent No.: US 12,716,450 B2
(45) Date of Patent: Aug. 25, 2026

(54) ELECTRIC VEHICLE DRIVE MOTOR BEARING ASSEMBLY

(71) Applicant: JTEKT Bearings North America LLC, Greenville, SC (US)

(72) Inventor: Daniel J. Schertz, Pickens, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 28 days.

(21) Appl. No.: 18/652,643

(22) Filed: May 1, 2024

(65) Prior Publication Data

US 2024/0369104 A1 Nov. 7, 2024

Related U.S. Application Data

(60) Provisional application No. 63/463,811, filed on May 3, 2023.

(51) Int. Cl.

| | |
|---|---|
| ***F16C 19/06*** | (2006.01) |
| ***F16C 19/52*** | (2006.01) |
| ***F16C 35/077*** | (2006.01) |
| ***H02K 5/173*** | (2006.01) |

(52) U.S. Cl.

CPC .............. *F16C 19/06* (2013.01); *F16C 19/52* (2013.01); *F16C 35/077* (2013.01); *H02K 5/1732* (2013.01); *F16C 2380/26* (2013.01)

(58) Field of Classification Search

CPC ........ F16C 19/06; F16C 19/52; F16C 35/077; F16C 2202/30; F16C 2223/10; F16C 2380/26; H02K 5/1732; H02K 5/1735

See application file for complete search history.

(56) References Cited

U.S. PATENT DOCUMENTS

| | | | | |
|---|---|---|---|---|
| 4,116,075 | A | 9/1978 | Ort | |
| 5,059,041 | A * | 10/1991 | Watanabe | F16C 19/52 384/536 |
| 6,966,701 | B2 | 11/2005 | Schelbert | |
| 2015/0217392 | A1* | 8/2015 | Friedrich | F16C 19/54 228/234.3 |
| 2017/0016786 | A1 | 1/2017 | Heim | |

FOREIGN PATENT DOCUMENTS

| | | | |
|---|---|---|---|
| DE | 102011087471 A1 | 6/2013 | |
| DE | 102013225341 A1 * | 6/2015 | F16C 35/073 |

(Continued)

OTHER PUBLICATIONS

DE102020106338A1_Description.*

(Continued)

*Primary Examiner* — Phillip A Johnson

(74) *Attorney, Agent, or Firm* — Nelson Mullins Riley & Scarborough LLP

(57) ABSTRACT

A bearing assembly comprises a first ring defining a first rolling surface and a second ring defining a second rolling surface opposed to the first rolling surface. A plurality of rolling elements are located between the first ring and the second ring in rolling engagement with the first rolling surface and the second rolling surface. A cup is positioned outside an associated one of the first ring and the second ring. Insulative sheet material interposes the cup and the associated one of the first ring and the second ring, the insulative sheet material being retained in position by the cup.

19 Claims, 5 Drawing Sheets

(56) References Cited

FOREIGN PATENT DOCUMENTS

| | | | | | |
|---|---|---|---|---|---|
| DE | 102016223199 | A1 | | 5/2018 | |
| DE | 102020106338 | A1 | * | 9/2021 | .............. F16C 19/06 |
| DE | 10 2020 114341 | A1 | | 12/2021 | |
| DE | 102021109281 | A1 | * | 10/2022 | ............ F16C 35/077 |
| DE | 102021211223 | A1 | * | 4/2023 | ............ F16C 35/077 |
| EP | 0800011 | B1 | | 11/2002 | |
| JP | S53 85508 | U | | 7/1978 | |
| JP | H0525337 | U | | 4/1993 | |
| JP | H09304006 | A | | 11/1997 | |
| JP | 2000-304628 | A | | 11/2000 | |
| JP | 2002048145 | A | * | 2/2002 | ............ F16C 33/586 |
| JP | 2007-101515 | A | | 4/2007 | |
| JP | 2008082415 | A | * | 4/2008 | ............ F16C 35/077 |
| JP | 5010190 | B2 | | 8/2012 | |
| JP | 2017-096445 | A | | 6/2017 | |
| WO | 2016/159245 | A1 | | 10/2016 | |

OTHER PUBLICATIONS

DE102021211223A1_Description.*

IInternational Search Report and Written Opinion for the corresponding PCT application, PCT/US2024/027502, dated Jul. 23, 2024, 15 pages.

* cited by examiner

ELECTRIC VEHICLE DRIVE MOTOR BEARING ASSEMBLY

CROSS-REFERENCE TO RELATED APPLICATION

This application is based upon and claims priority to U.S. provisional patent application No. 63/463,811, filed May 3, 2023, which is incorporated herein in its entirety for all purposes.

FIELD OF THE INVENTION

The present invention relates generally to electric vehicles (EVs) and, more particularly, to an insulated bearing assembly used to rotatably support the shaft of an EV drive motor.

BACKGROUND OF THE INVENTION

As is well-known, EVs utilize electric motors to provide wheel rotation rather than internal combustion engines. The motors have a stator that produces a magnetic flux causing a rotor to rotate. The rotor is typically carried by a shaft that is supported for rotation by bearings. It is known that bearings utilized in this environment can be subject to pitting of the rolling surface. Specifically, an electric current passing through a bearing can generate sparks between the raceways and the rolling elements. This can result in melting of the surface metal at the location of the spark, known as "pitting." Such pitting may in some cases cause the rolling surface to become corrugated, but in any event is considered deleterious to the function of the bearing.

Often, bearings used in electric motors are insulated to reduce pitting. Prior attempts at insulating bearings have used an insulating coating or polymeric material on the OD or ID of the bearing. In other cases, components of the bearing have been made from non-conducting (ceramic) material in order to impede current flow.

The present invention recognizes and addresses considerations of prior art constructions and methods.

SUMMARY OF THE INVENTION

One aspect of the present invention provides a bearing assembly comprising a first ring defining a first rolling surface and a second ring defining a second rolling surface opposed to the first rolling surface. A plurality of rolling elements are located between the first ring and the second ring in rolling engagement with the first rolling surface and the second rolling surface. A retainer is positioned outside an associated one of the first ring and the second ring. Insulative sheet material interposes the retainer and the associated one of the first ring and the second ring. Preferably, the insulative sheet material is retained in position by the retainer.

In some exemplary embodiments, the retainer comprises a cylindrical portion. For example, the retainer may be in the form of a cup having a radial flange at one end of the cup.

In some exemplary embodiments, each of the first ring and the second ring has a first end face, a second end face, and a cylindrical surface between the first end face and the second end face. According to such embodiments, the cup has a first flange, a second flange, and a cylindrical portion respectively retaining the insulative sheet material in relation to the first end face, the second end face, and the cylindrical portion of the associated one of the first ring and the second ring.

In some exemplary embodiments, the insulative sheet material may comprise a unitary piece of insulative sheet material cut into a selected pattern. For example, the selected pattern may have a central hub from which a plurality of radial arms integrally extend. Such radial arms may each have first and second reduced width portions serving as hinges.

In some exemplary embodiments, the cup may be a drawn cup. Moreover, the first flange and the cylindrical portion of the cup may be hardened with the second flange of the cup being not hardened.

Another aspect of the present invention provides a method of insulating a bearing having an inner ring, an outer ring, and a plurality of rolling elements between the inner ring and the outer ring. One step of the method involves providing a cup having a radial first flange and an open end. Another step involves inserting a unitary piece of insulative sheet material having a central hub from which a plurality of radial arms integrally extend into the cup such that the central hub is adjacent to the first flange and the radial arms are folded perpendicular to the central hub. The method also involves inserting the bearing into the cup such that the insulative sheet material interposes the outer ring of the bearing and adjacent inner surfaces of the cup. A portion of the cup may be folded to close the open end such that the bearing will be retained with respect to the cup.

According to a still further aspect, the present invention provides a bearing assembly comprising a first ring defining a first rolling surface. A second ring defining a second rolling surface opposed to the first rolling surface is also provided. According to this aspect, each of the first ring and the second ring has a first end face, a second end face, and a cylindrical surface between the first end face and the second end face A plurality of rolling elements are located between the first ring and the second ring in rolling engagement with the first rolling surface and the second rolling surface. A cup is positioned outside an associated one of the first ring and the second ring, the cup having a first flange, a second flange, and a cylindrical portion. Insulative sheet material interposes the cup and the associated one of the first ring and the second ring, the insulative sheet material being retained in position by the cup.

The accompanying drawings, which are incorporated in and constitute a part of this specification, illustrate one or more embodiments of the disclosure and, together with the description, serve to explain various principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
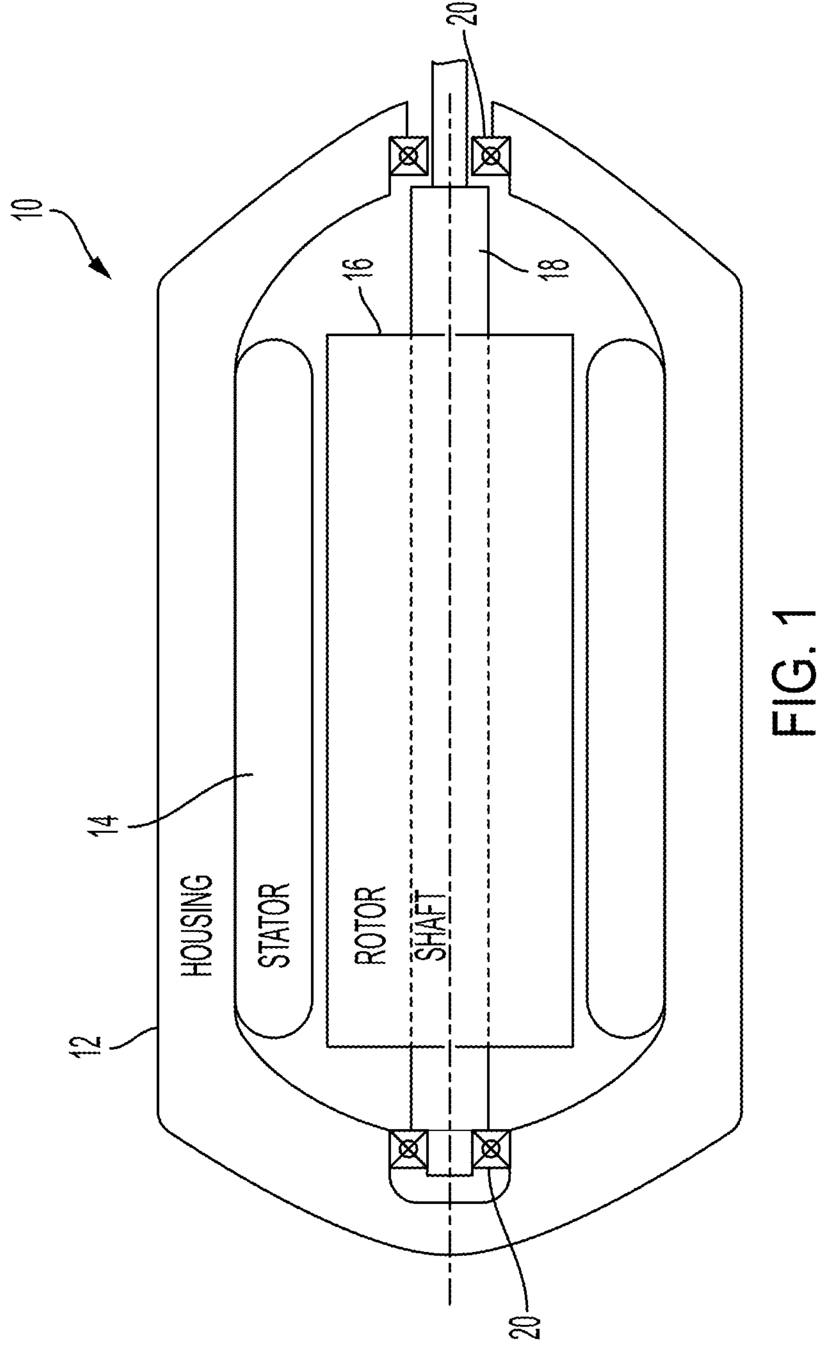
FIG. 1 is a diagrammatic representation of an electric motor which may utilize one or more bearing assemblies constructed in accordance with the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position of the bearing assembly, such as but not limited to "vertical," "horizontal," "top," "bottom," "above," or "below," refer to directions and relative positions with respect to the bearing assembly's orientation shown in FIG. 1. Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. Therefore, the phrase "X employs A or B" is satisfied by any of the following instances: X employs A; X employs B; or X employs both A and B. In addition, the articles "a," "an," and "the" as used in this document should generally be construed to mean "one or more" unless specified otherwise or clear from the context to be directed solely to a singular form. The meaning of "in" may include "in" and "on." The word "at" may include "at," "adjacent to," and "on." The phrase "in one embodiment," as used herein does not necessarily refer to the same embodiment, although it may. The meanings identified above do not necessarily limit the terms, but merely provide illustrative examples for the terms.

FIG. 1 is a simplified diagram of an electric motor 10 which may, for example, be utilized to provide the motive force for an EV. Motor 10 includes a housing 12 containing a fixed stator 14. Stator 14 produces magnetic flux to cause rotation of a rotor 16 that is concentric with stator 14. Rotor 16 is carried by a shaft 18 that is supported for rotation by a pair of bearing assemblies 20 that are mounted in fixed locations with respect to housing 12. As one skilled in the art will appreciate, shaft 18 continues outside of housing 12 so that it may be appropriately connected to the drive train of the EV.

Figure 2:
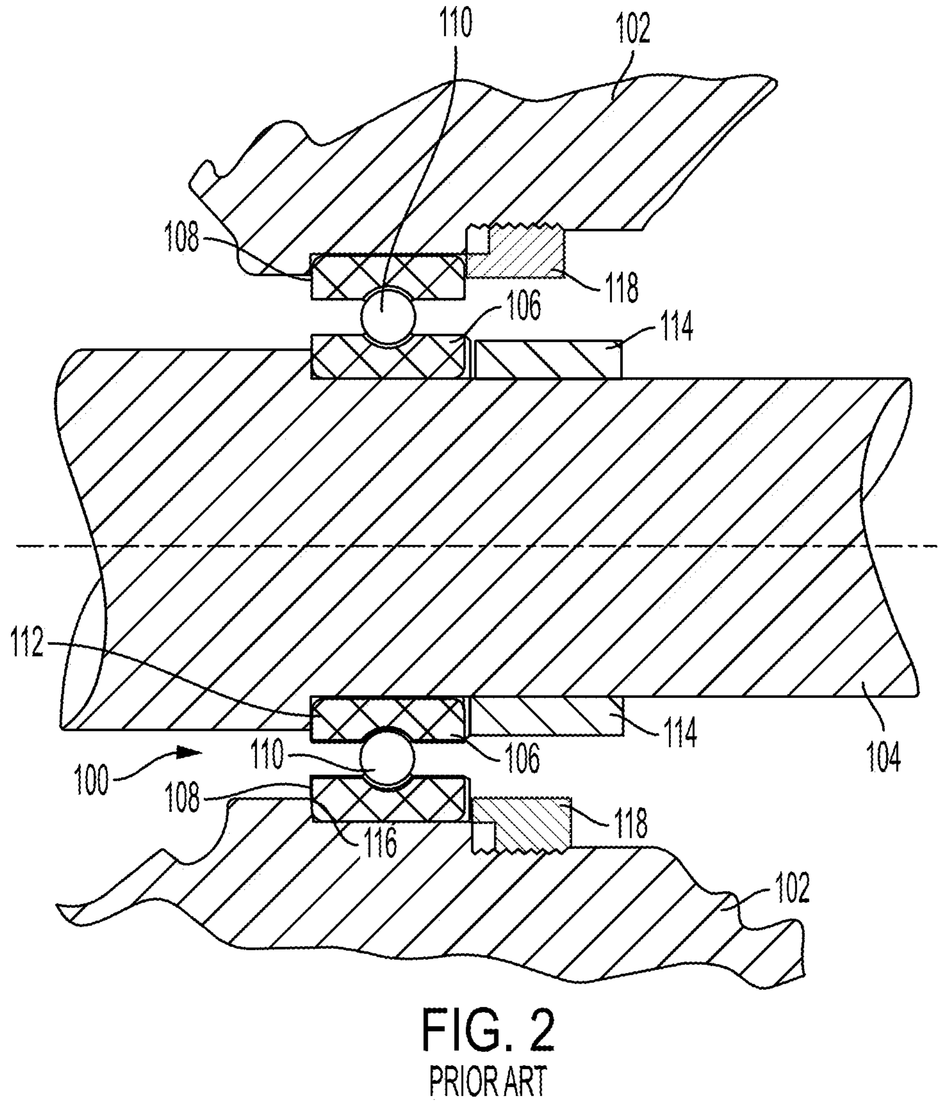
FIG. 2 is a fragmentary, partial cross-sectional view of a prior art bearing assembly utilized in an EV electric motor.

Before discussing the construction of bearing assembly 20, it is helpful to describe certain aspects of the prior art in greater detail. Referring now to FIG. 2, a bearing assembly 100 of the prior art is mounted with respect to a housing 102 so as to rotatably support a shaft 104. Bearing assembly 100 has an inner ring 106 and an outer ring 108. As shown, inner ring 106 and outer ring 108 are concentric with each other and define opposing rolling surfaces (raceways) in which a plurality of rolling elements 110 are located. Inner ring 106 is fixed with respect to shaft 104 between a radial face 112 and a constraint ring 114. Similarly, outer ring 108 is fixed with respect to housing 102 between a radial face 116 and a constraint ring 118. Rings 114 and 118 may be respectively attached to shaft 104 and housing 102 by threaded connection, press fit, snap ring, etc. As noted above, bearing assembly 100 may be rendered insulating by an insulating coating or polymeric material on the OD or ID of the bearing or by forming components of the bearing from non-conducting (ceramic) material.

Figure 3:
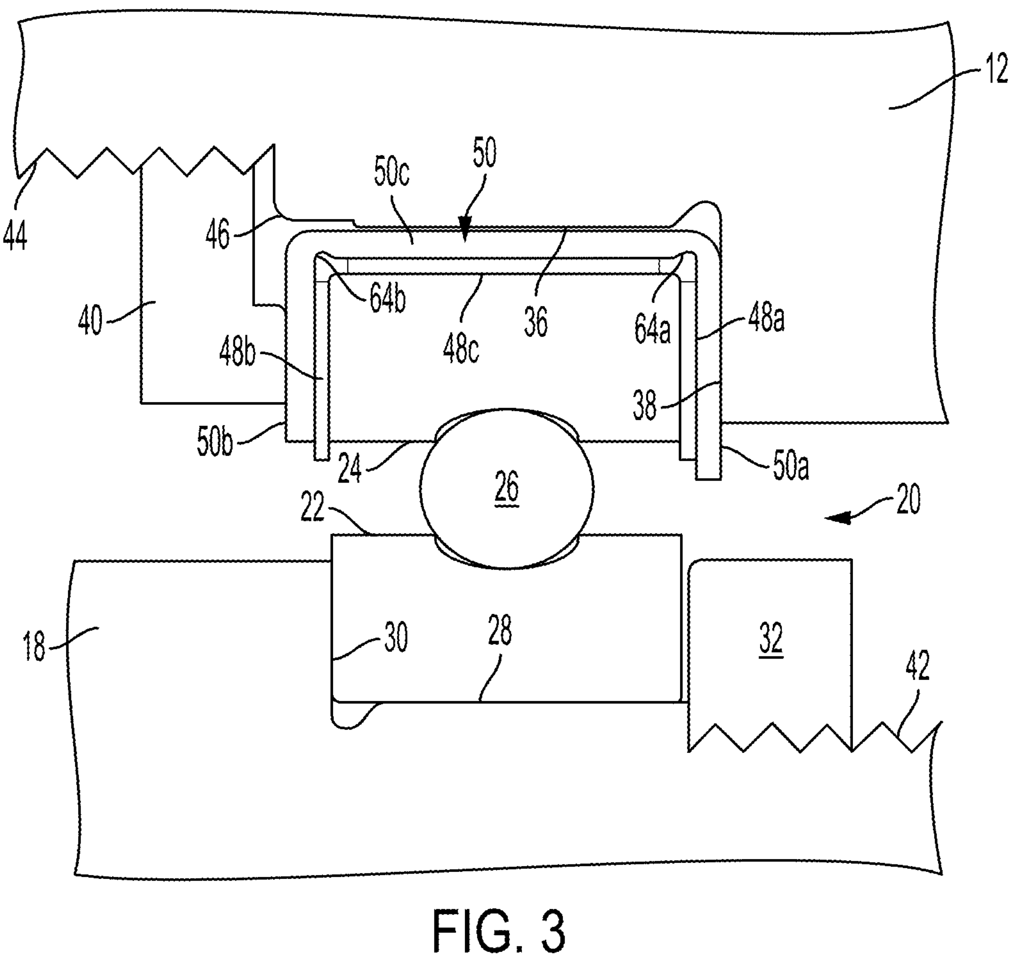
FIG. 3 is a diagrammatic representation of a bearing assembly constructed in accordance with the present invention which may be utilized in an electric motor.

Certain aspects of bearing assembly 20 can be most easily explained with reference to FIG. 3. As shown, bearing assembly 20 has an inner ring 22 and an outer ring 24 defining opposed rolling surfaces (raceways) in which a plurality of rolling elements 26 are located. (One skilled in the art will appreciate that rings 22 and 24 both completely circumscribe shaft 18 although only a portion of bearing assembly 20 is shown here for simplicity.) In this embodiment, rings 22 and 24 are concentric with one another and rolling elements 26 are formed as balls. One skilled in the art will appreciate, however, that aspects of the present invention may be used in a variety of bearing types, including needle roller bearings, tapered roller bearings, and thrust bearings. The rolling elements themselves may take various forms, including balls (as shown), needle rollers, cylindrical rollers, and tapered rollers.

Inner ring 22 is fixed with respect to shaft 18 and outer ring 24 is fixed with respect to housing 12. In this regard, shaft 18 defines a reduced diameter portion 28 defining a radial face 30. During assembly, inner ring 22 is slid onto reduced diameter portion 28 and retained against radial face 30 by a constraint ring 32. Similarly, outer ring 24 is retained in an annular pocket 36 of housing 12 between a radial face 38 of the pocket 36 and a constraint ring 40. In this case, constraint ring 32 is threaded onto shaft 18 via threads 42. Similarly, constraint ring 40 is threaded into housing 12 via threads 44. One skilled in the art will appreciate, however, that other appropriate means of retaining constraint rings 32 and 40 may be provided in various embodiments, such as press fit and snap rings, as necessary or desired. In addition, reduced diameter portion 28 and/or pocket 36 may include features to facilitate slidable placement of bearing assembly 20. For example, in this embodiment, pocket 36 defines a chamfer 46 which facilitates insertion of bearing assembly 20.

Bearing assembly 20 also includes features so it will be electrically isolated from electric current such as stray currents that may develop in the housing 12. In this regard, one or more insulators are provided between one or both of the bearing rings and the external structure. Preferably, the insulators may be sheet-like structures formed of flexible insulative material retained against surfaces of the bearing ring by a cup. In this regard, FIG. 3 shows insulative sheets **48*a* and 48*b* adjacent the end faces of outer ring 24 with a sheet 48*c* being adjacent the outer cylindrical surface of outer ring 24. It will thus be appreciated that sheets 48*a* and 48*c* have a radial orientation whereas sheet 48*c* has a cylindrical orientation. Sheets 48*a-c* are retained in this position by a suitable retaining element, here in the form of a cup 50 having axially spaced end flanges 50*a* and 50*b* along with a cylindrical portion 50*c*. As will be explained more fully below, cup 50 may be formed as a drawn metal cup. While cup 50** may itself be conductive, the bearing rings and roller are isolated from electric current by the insulating sheets.

It will be appreciated that sheets **48*a-c* may be separate elements in some embodiments. For example, sheets 48*a* and 48*b* may be formed as discs with suitable inner diameter (ID) and outer diameter (OD) whereas sheet 48*c* may have a tubular shape of the appropriate ID. Such shapes may or may not be continuous around their entire annulus so long as any gaps are not big enough to allow metal to metal contact and allows a sufficient separation between metal components. For example, sheet 48***c* may be formed with a slit allowing it to be easily wrapped around the exterior of outer ring 24.

Figure 5:
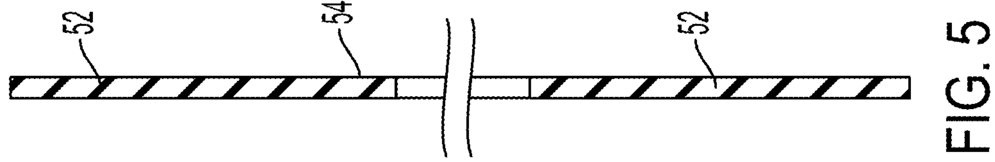
FIG. 5 is a cross-sectional view taken along line 5-5 of FIG. 4.
Figure 4:
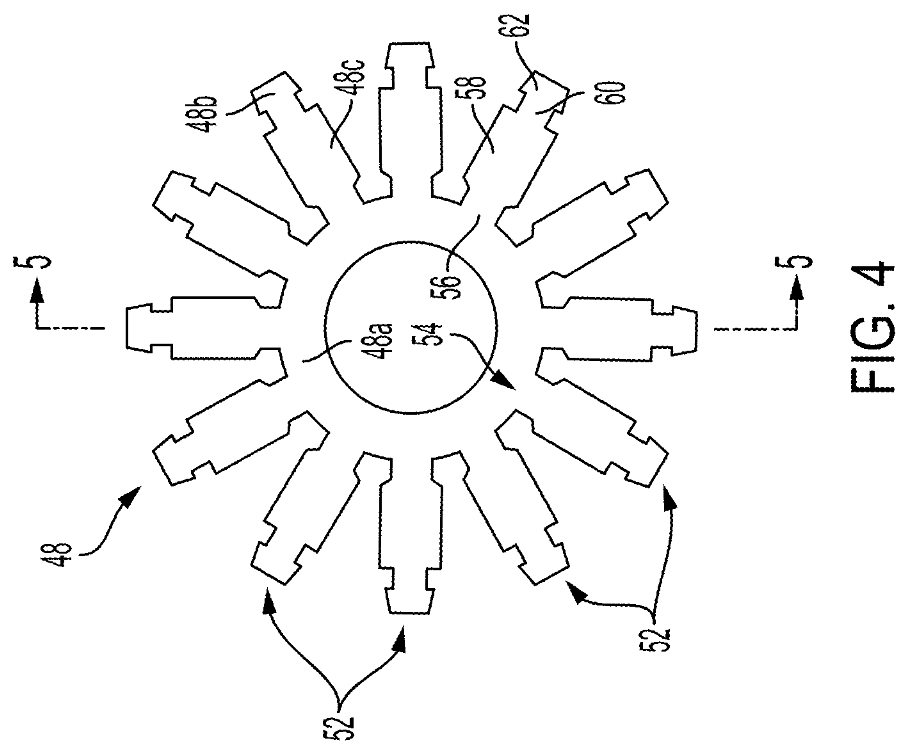
FIG. 4 shows an insulative insert that may be used in the bearing assembly of FIG. 3.

Referring now to FIGS. 4 and 5, the insulating sheets 48*a-c* may be portions of a larger sheet 48 of flexible insulative material (e.g., a suitable polymeric material having a thickness of approximately 500 μm or other suitable thickness) cut into a suitable pattern. For example, sheets 48 may be stamped from a continuous sheet of insulative material at high volume and low cost. In this embodiment, sheet 48 has a rosette pattern in which a plurality of radial arms 52 extend from a central hub (or base ring) 54. The sheet 48 is preferably configured to avoid crumple or in plane deformation required if wrapping it around the ends and OD of a bearing ring. In this case, base ring 54 has an ID and OD nearly matching the face diameter of the bearing ring to protect. There is a bendable transition, here in the form of a first reduced width portion 56, that forms a hinge for folding of the arm 52 onto the bearing ring's OD. Sheet portion 58, radially outward of reduced width portion 56, matches the axial length and collectively approximates the circumference of the bearing ring's OD to protect. A second bendable transition, here in the form of a second reduced width portion 60, forms a hinge for folding of end pie portions 62 that protect the opposite face of the bearing ring. In this embodiment, one skilled in the art will thus appreciate that base ring 54 corresponds to sheet 48*a*, sheet portions 58 collectively correspond to sheet 48*c*, and pie portions 62 collectively correspond to sheet 48*b*.

The sum of widths of the sheet portions 58 may preferably add to approximately 90% or more of the bearing ring's OD, but they should not overlap each other. It will be appreciated that small uncovered sections of the bearing ring's OD may have a gap of shim thickness to the cup 50 and that gap should in many cases be sufficiently insulative to prevent current flow. Similarly, gaps between the reduced width portions 56 and 60 at the corners between the OD and end faces of the bearing ring should be sufficiently insulative to prevent current flow. The drawn cup may be formed with reduced thickness regions, such as regions 64*a-b* (FIG. 3) to increase the gap thickness in these locations, as necessary or desired.

Figure 6A:
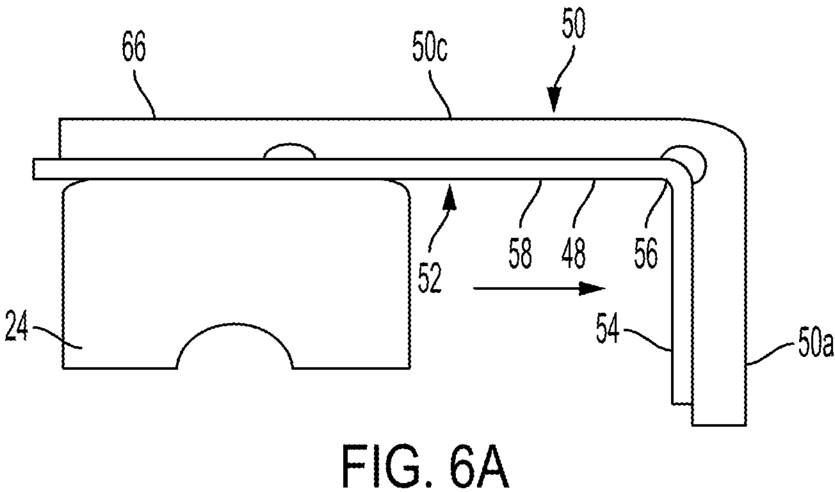
FIGS. 6A-6C diagrammatically illustrate certain steps in the manufacture of the bearing assembly of FIG. 3.
Figure 6B:
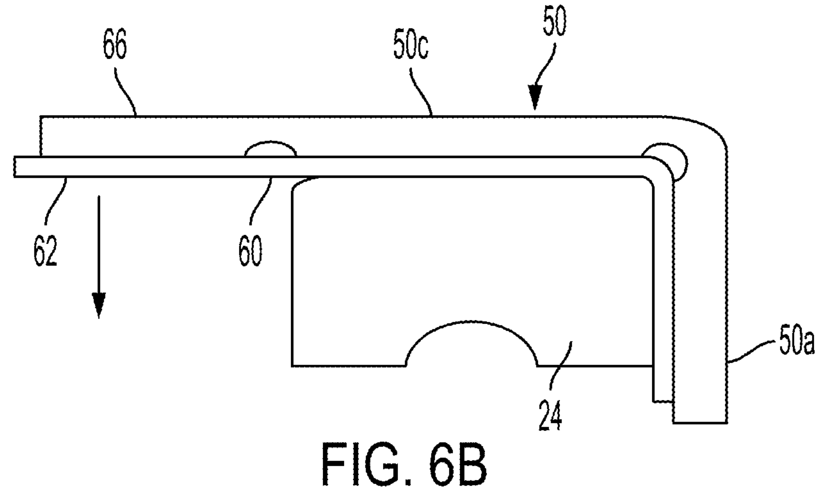
Figure 6C:
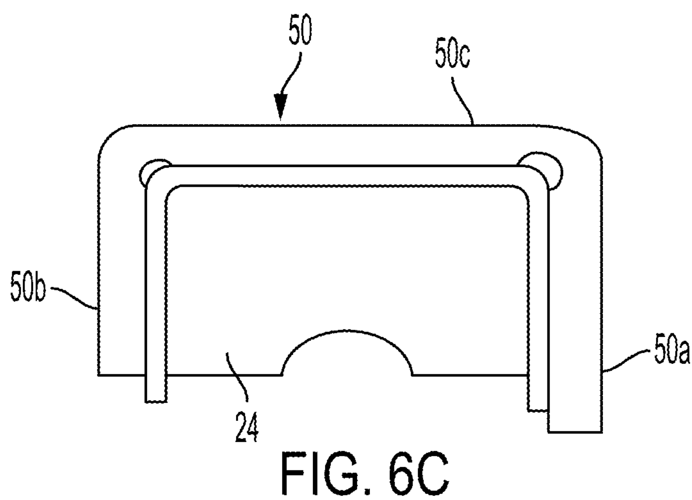

FIGS. 6A-6C illustrate certain aspects of assembling a bearing assembly in accordance with embodiments of the present invention. In this case, cup 50 may be a drawn cup formed from an annular metal sleeve, e.g., made from low carbon steel. Prior to assembling other components into cup 50, first end flange 50*a* is formed at one end of cup 50. At this point, flange 50*a* and cylindrical portion 50*c* may be heat treated, leaving the portion that will become end flange 50*b* untreated. Alternatively, the portion that will become end flange 50*b* may utilize a hot curl end or lower cost curl method. Sheet 48 is then inserted into the open end of cup 50 with base ring 54 being adjacent to first end flange 50*a*. The radial arms 52 are folded perpendicularly at reduced width portion 56, as shown.

As indicated by the arrow in FIG. 6A, outer ring 24 is then slidably inserted into the cup 50 until one of its end faces is adjacent to base ring 54. As indicated by the arrow in FIG. 6B, end flange 50*b* is then formed by folding a portion 66 of cup 50 so as to capture bearing ring 24. Sheet 48 is folded accordingly at reduced width portion 60 such that pie portions 62 cover the opposite end face of bearing ring 24.

Embodiments are contemplated using a non-hardened drawn cup especially since some anticipated applications utilize a bearing pressed into an aluminum housing. Due to the drawn cup, good press-fit is achieved within a housing bore which is not lost over time. Due to the press fit of the drawn cup over insulator, the tight fit of the insulator over the bearing ring should be maintained as well. If needed to prevent creep, an end shape or contour can be provided on either end face of the bearing for the drawn cup to be bent into (almost like a key groove of a bearing and a key made into the drawn cup so as to prevent rotation).

While one or more preferred embodiments of the invention are described above, it should be appreciated by those skilled in the art that various modifications and variations can be made in the present invention without departing from the scope and spirit thereof.

The invention claimed is:

1. A bearing assembly comprising:
- a first ring defining a first rolling surface;
- a second ring defining a second rolling surface opposed to the first rolling surface;
- the first ring and the second ring each having a first end face, a second end face, and a cylindrical surface between the first end face and the second end face;
- a plurality of rolling elements located between the first ring and the second ring in rolling engagement with the first rolling surface and the second rolling surface;
- a retainer positioned outside an associated one of the first ring and the second ring; and
- insulative sheet material interposing the retainer and the associated one of the first ring and the second ring, the insulative sheet material being retained in position by the retainer,
- wherein the retainer is formed as a cup having a first flange, a second flange, and a cylindrical portion respectively retaining the insulative sheet material in relation to the first end face, the second end face, and the cylindrical portion of the associated one of the first ring and the second ring,
- wherein the insulative sheet material comprises a unitary piece of insulative sheet material cut into a selected pattern, wherein the selected pattern has a central hub from which a plurality of arms integrally extend.

2. The bearing assembly as set forth in claim 1, wherein each of the arms has first and second reduced width portions serving as hinges.

3. The bearing assembly as set forth in claim 1, wherein the cup is a drawn cup.

4. The bearing assembly as set forth in claim 3, wherein the first flange and the cylindrical portion of the cup are hardened.

5. The bearing assembly as set forth in claim 4, wherein the second flange of the cup is not hardened.

6. A method of insulating a bearing having an inner ring, an outer ring, and a plurality of rolling elements between the inner ring and the outer ring, the method comprising:
- providing a cup having a radial first flange and an open end;
- inserting a unitary piece of insulative sheet material having a central hub from which a plurality of radial arms integrally extend into the cup such that the central hub is adjacent to the first flange and the radial arms are folded perpendicular to the central hub; and
- inserting the bearing into the cup such that the insulative sheet material interposes the outer ring of the bearing and an adjacent inner surface of the cup.

7. The method as set forth in claim 6, further comprising: folding a portion of the cup to close the open end such that the bearing will be retained with respect to the cup.

8. A bearing assembly comprising:

a first ring defining a first rolling surface;

a second ring defining a second rolling surface opposed to the first rolling surface;

each of the first ring and the second ring has a first end face, a second end face, and a cylindrical surface between the first end face and the second end face;

a plurality of rolling elements located between the first ring and the second ring in rolling engagement with the first rolling surface and the second rolling surface;

a cup positioned outside an associated one of the first ring and the second ring, the cup having a first flange, a second flange, and a cylindrical portion; and insulative sheet material interposing the cup and the associated one of the first ring and the second ring, the insulative sheet material being retained in position by the cup, the insulative sheet material being respectively retained in relation to the first end face, the second end face, and the cylindrical portion of the associated one of the first ring and the second ring, wherein the insulative sheet material comprises a unitary piece of insulative sheet material having a central hub from which a plurality of arms integrally extend.

9. The bearing assembly as set forth in claim 8, wherein each of the arms has first and second reduced width portions serving as hinges.

10. The bearing assembly as set forth in claim 8, wherein the cup is a drawn cup.

11. The bearing assembly as set forth in claim 10, wherein the first flange and the cylindrical portion of the cup are hardened.

12. The bearing assembly as set forth in claim 11, wherein the second flange of the cup is not hardened.

13. A bearing assembly comprising:

a first ring defining a first rolling surface;

a second ring defining a second rolling surface opposed to the first rolling surface;

each of the first ring and the second ring has a first end face, a second end face, and a cylindrical surface between the first end face and the second end face;

a plurality of rolling elements located between the first ring and the second ring in rolling engagement with the first rolling surface and the second rolling surface;

a cup positioned outside an associated one of the first ring and the second ring, the cup having a first flange, a second flange, and a cylindrical portion; and insulative sheet material interposing the cup and the associated one of the first ring and the second ring, the insulative sheet material being retained in position by the cup, wherein the insulative sheet material comprises a single piece of flat flexible insulative sheet material cut into a pattern and folded so that first, second, and third portions of the single piece of flexible insulative sheet material are respectively retained in relation to the first end face, the second end face, and the cylindrical portion of the associated one of the first ring and the second ring.

14. The bearing assembly as set forth in claim 13, wherein the flexible insulative sheet material comprises a polymeric material.

15. The bearing assembly as set forth in claim 14, wherein the polymeric material has a thickness of approximately 500 μm.

16. The bearing assembly as set forth in claim 13, wherein the cup has at least one reduced thickness portion at a selected location in an inner surface of the cup to increase air gap thickness at the selected location.

17. The bearing assembly as set forth in claim 13, wherein the cup is a drawn cup.

18. The bearing assembly as set forth in claim 17, wherein the first flange and the cylindrical portion of the cup are hardened.

19. The bearing assembly as set forth in claim 18, wherein the second flange of the cup is not hardened.

* * * * *